Oct. 21, 1952 G. D. ELMER 2,614,480
PACKAGED ARTICLE COOKER
Filed March 27, 1947 7 Sheets-Sheet 5

INVENTOR.
GEOFFREY D. ELMER
BY
Strauch & Hoffman
ATTORNEYS

Fig. 12

Patented Oct. 21, 1952

2,614,480

UNITED STATES PATENT OFFICE 2,614,480

PACKAGED ARTICLE COOKER

Geoffrey D. Elmer, Dearborn, Mich.

Application March 27, 1947, Serial No. 737,651

9 Claims. (Cl. 99—327)

The present invention relates to and deals generally with the vending of packaged food products and beverages by means of a coin actuated vending machine, and more particularly to the cooking or heating unit and the operating circuits therefor employed in such machines.

Devices have been proposed for cooking or heating packaged or non-packaged articles of food, but none are known to have satisfactorily accomplished this objective in commercial use. In all known instances the commercial failure has resulted primarily because of the failure of the cooking unit to properly cook or heat the food in the short available time.

It is, therefore, the primary object of this invention to provide a cooking or heating unit in which food and beverages, sustained at ambient or refrigerated temperatures, may be efficiently heated or cooked at a temperature of approximately 212° F. in a time period not in excess of 15 seconds, and discharged therefrom to the purchaser in an edible state.

Another important object of this invention is to provide a conduction heating or cooking device which imparts a constantly accelerated flow of heat to and a uniformly distributed temperature rise in a packaged food or beverage until it reaches an approximate temperature of 212° F.

A further object of the invention is to provide automatic mechanism which may be adjusted or regulated to properly control the feeding to the cooking or heating unit, cooking and dispensing of packaged foods.

It is still another object of this invention to provide a conduction heating or cooking device which will effectively raise the temperature of the packaged articles to approximately 212° F. while keeping the surface temperature of the articles below the char point of the container.

A still further object of this invention is to provide a heater or cooker of the above character having a heating body composed of two parts or heating surfaces articulated to move toward or away from each other and permit sufficient clearance when open for the entrance and exit of the packaged article.

A further object of this invention is to provide the heater or cooker with polished heating surfaces shaped to fit intimately and uniformly the surfaces of the packaged article to be cooked or heated.

Another object of this invention is to provide means for correctly positioning the packaged article in the heater initiating the actuating movement of the heating surfaces after positioning to bring the heating surfaces in contact with the packaged article under a compressive force to be maintained on the articles during the cooking or heating period to promote proper heat transfer from the heating medium to the article by conduction, and then to release the article after heating or cooking for delivery to the consumer.

A further object of this invention is to provide a heating or cooking unit arranged to utilize independent heating elements, normally electrically connected in series, as stand-by heaters with a controlling thermostat maintaining approximate cooking or heating temperature of the heating surfaces and means arranged to automatically connect the heating elements in parallel for the predetermined cooking or heating period.

A still further object of the present invention resides in the provision of a heating and cooking unit arranged so a minimum of heat leakage is assured.

It is yet another object of this invention to provide a counter-type heater or cooker having a plurality of heating or cooking units which may be manually operated as the pre-packaged article is inserted.

A further object of this invention is to provide a coin actuated electrical system incorporating a heater or cooker which automatically supplies heat for a predetermined time to a packaged article and releases the cooked packaged article to the consumer.

Further objects of this invention will appear from the following description when read in conjunction with the appended claims and attached drawings, wherein:

Referring to the drawings, wherein like reference characters refer to the same parts throughout the various figures of the drawings, numeral 20 generally designates the heating or cooking unit having a valve assembly 21, stop and switch mechanism 22, and actuating means 23, all supported on frame 24. The heater or cooker 20 contains heating elements designated generally by numeral 26 (Figures 2 and 5) preferably consisting of two plates 28, in the present embodiment of semi-cylindrical form, each of which is provided with two extended arms 29 along one edge (Figures 2, 4 and 6) which function in use as the hinge points of plates 28. Arms 29 are connected to supporting frame 24 by cap screws 31 which have one end thereof threadedly engaged in inwardly extending bosses 25 located at opposite ends of frame 24. Longer arms 32, centrally located on the same edge of plates 28, act as the center hinge arms and extend beyond the hinge point to form levers fulcrumed about hinge pin 33.

Figures 5, 9, 10, 11:
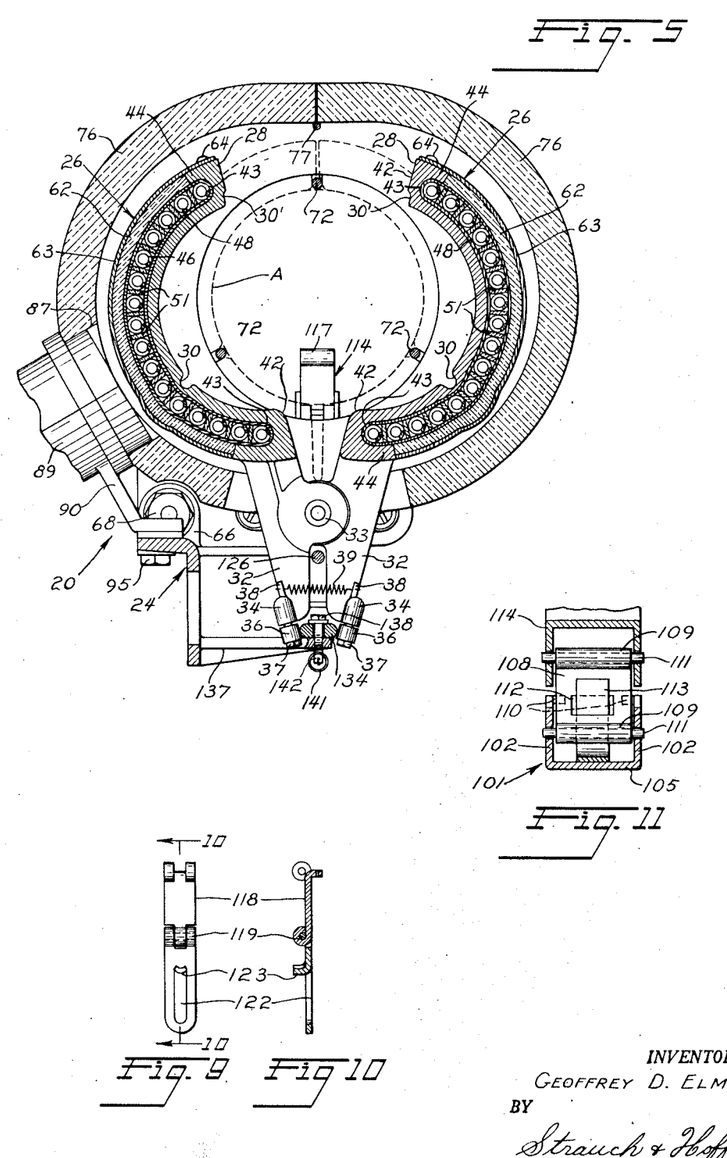
Figure 5 is a sectional view taken substantially on line 4—4 of Figure 2.
Figure 9 is an elevational view of a link which is a portion of the stop and switch mechanism.
Figure 10 is a sectional view taken on line 10—10 of Figure 9.
Figure 11 is a sectional view taken on line 11—11 of Figure 2, showing another link which forms a part of the stop and switch mechanism.
Figure 6:
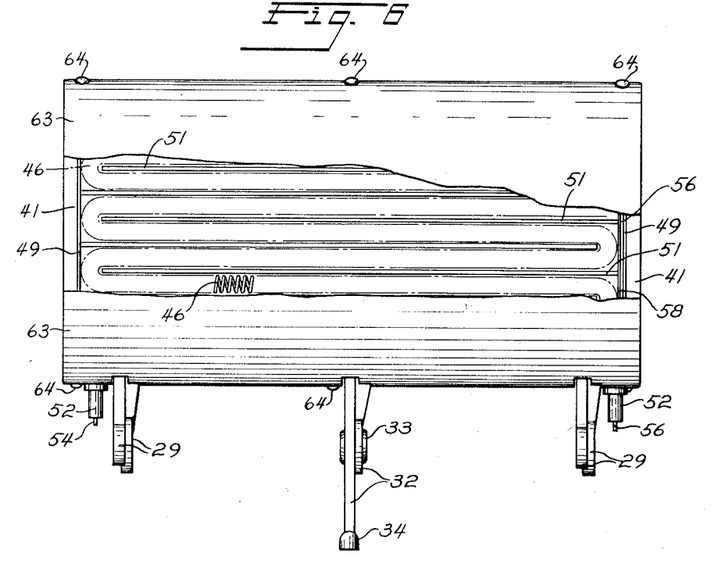
Figure 6 is a side elevational view of the heating elements with the casing partly broken away.

The free ends of arms 32 are provided with integrally formed lugs 34 to which follower rollers 36 are secured by pins 37, see Figure 5. Ears 38 are also formed cn the outer edge of arms 32 adjacents lugs 34 and a coil spring 39 secured therebetween tends to pull the outer ends of arms 32 together about hinge pin 33 and to positively hold the heating elements 26 in their open or non-cooking position. The ends of heating plates 28 are formed with arcuate end walls 41 (Figure 6) and the lateral edges of plates 28 are formed with an edge 42, substantially hook shaped in cross section, having a groove 43 and lip 44.

Each plate 28 is provided with any suitable type of electric heating element preferably a continuous coil heating element 46. Heating element 46 is positioned on the outer surface of plate 28 between end walls 41 and grooves 43 and is electrically insulated therefrom by mica sheet 48 and arcuate shaped mica end strips 49. The coil windings are electrically insulated from each other by mica strips 51.

Figure 7:
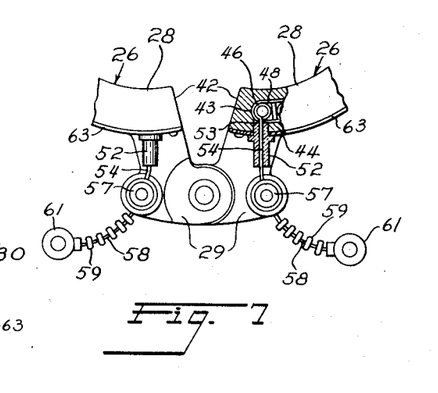
Figure 7 is a partial end view of the heating units having a portion broken away to show the electrical connections to the heating coil and showing the hinged connection between the two units.
Figure 8:
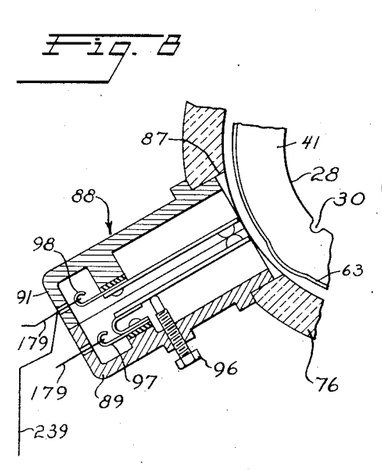
Figure 8 is a sectional view of the thermostat used on the heater or cooker of Figure 1.

Ceramic insulators 52 are positioned on the hinge edge of plates 28 between hinge arms 29 and the outer ends of the plate and are secured in a hole 53 (Figure 7) which passes through lip 44. One end 54 of coil 46 passes through one ceramic insulator 52 to a suitable electrical connection 57. The other end 56 of coil 46 passes along the opposite end wall 41 and is electrically insulated between arcuate mica strips 49 and 49' which are identical in shape and in turn covered by mica sheet 48. End 56 also extends through a ceramic insulator 52 to a suitable electrical connection 57. Flexible electrical wires 58, having small glass beads 59 secured thereon for insulative purposes, are also secured to electrical connections 57 and their opposite ends are provided with connections 61 for a purpose to be described later.

The convex outer surface of heating plates 28 between lips 44 is covered with a thermal insulation 62 of an asbestos-magnesium combination or any other suitable material, applied in sheet form to cover the entire convex outer surface of heating plate 28 and is substantially sealed by a semi-cylindrical closure plate 63 secured to plate 28 by suitable screws 64. The concave heating surface of plates 28 is highly polished to reflect the heat waves and has a longitudinal groove 30 adjacent its hinged edge and a longitudinal half groove 30' at its opposite edge. When plates 28 are in their closed position grooves 30 and 30' are spaced 120° from each other.

Frame 24 is also provided at both ends with ears 66 to which end caps 67 of any suitable material, preferably fabricated of cold moulded asbestos-silicate compound, are fastened by nut and bolt assemblies 68. End caps 67 have holes 69 formed therein to receive the outer end of the nut and bolt assembly 68 for a purpose to be described later. Circular openings 71 in end caps 67 allow the packaged article to be fed to and discharged from heater cooker 20 and package runway guides 72, positioned longitudinally through the device 120° apart, are secured to the walls of openings 71 by pins 73 and are received in groove 30 and half groove 30' of plates 28 when elements 26 are in cooking position. Substantially the entire outer peripheral edge of end caps 67 is grooved as at 74 to receive the ends of semi-cylindrical housing members 76, preferably made of the same material as the end caps. Members 76 are fastened for vertical rigidity and alignment by tie bars 77 and nuts 78 acting against end caps 67. Housings 76 have mating openings 79 and 81 through which arms 29 and 32 respectively protrude.

Suitable electrical terminals 82 at each end of heater 20 extend through end caps 67 and are secured to arms 83 located near the ends of frame 24. The connections 61 of flexible wires 58 are fastened on the inner ends of these terminals while the outer ends are connected in the electrical system employed.

Figure 1:
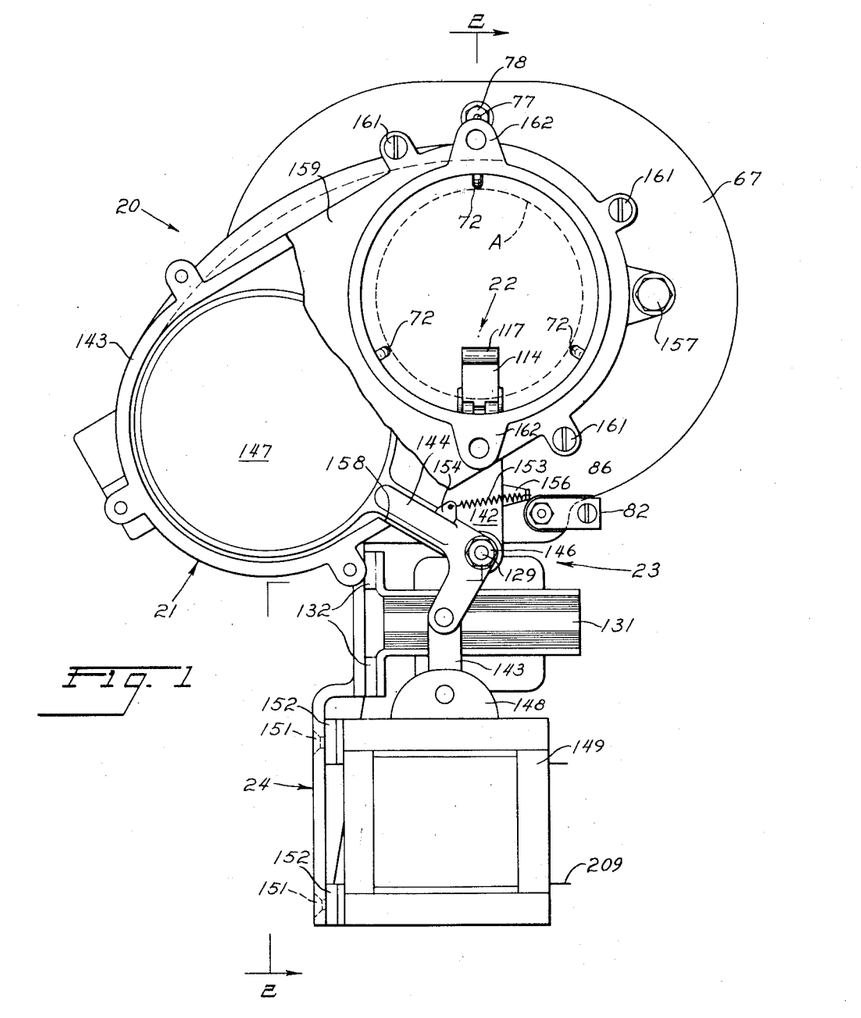
Figure 1 is a top plan view showing a preferred embodiment of a cooker or heater made in accordance with this invention, with the valve cover partially broken away.
Figure 4:
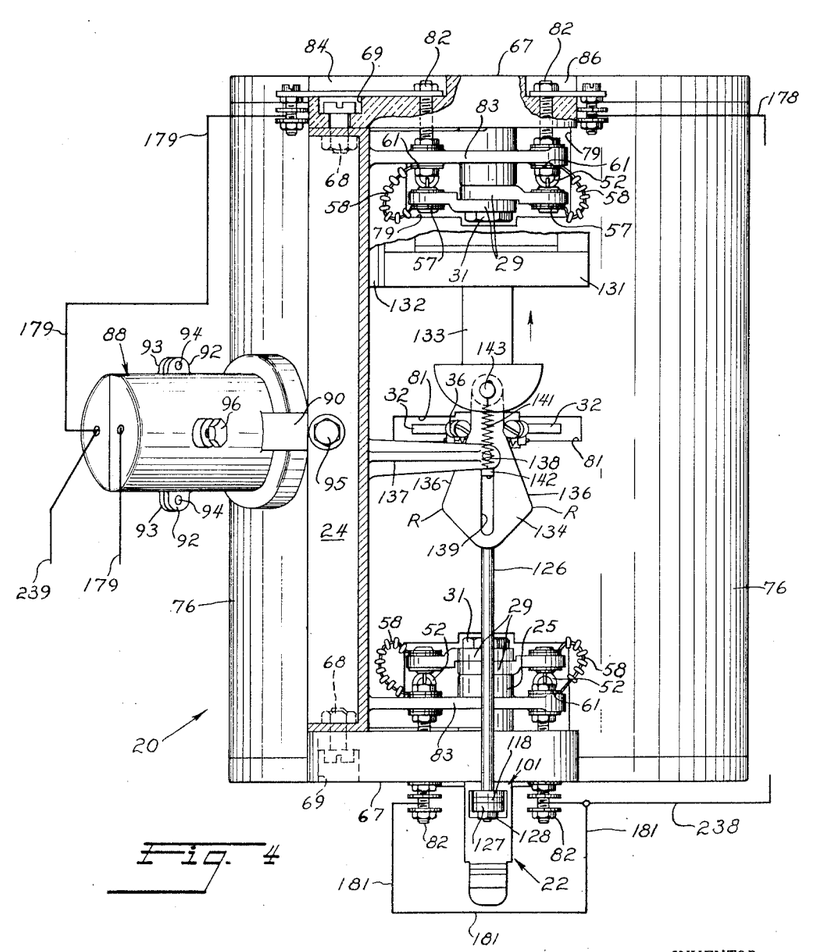
Figure 4 is a side elevational view of Figure 1.

End cap 67 on the upper end of the heater or cooker is recessed as at 84 and 86 to form channels for the electrical connections thereby allowing the proper positioning of the housing for gate valve 21 (Figures 1 and 4).

A further opening 87 in one housing member 76 receives a thermostat 88 which has a two piece housing 89 and 91, for ease of assembly, with mating ears 92 and 93 secured together by bolts 94. Housing 89 is also provided with an integral supporting arm 90 which is fastened to frame 24 by bolt 95 to further support thermostat 88. The thermostat 88 is of preferably the well known bimetallic construction with a regulating screw 96 and suitable electrical insulation and connections 97 and 98. The contact members of thermostat 88 are thereby located in close proximity with one heating element 26 and regulates the flow of current to the heating elements to keep them at a predetermined temperature.

Figure 3:
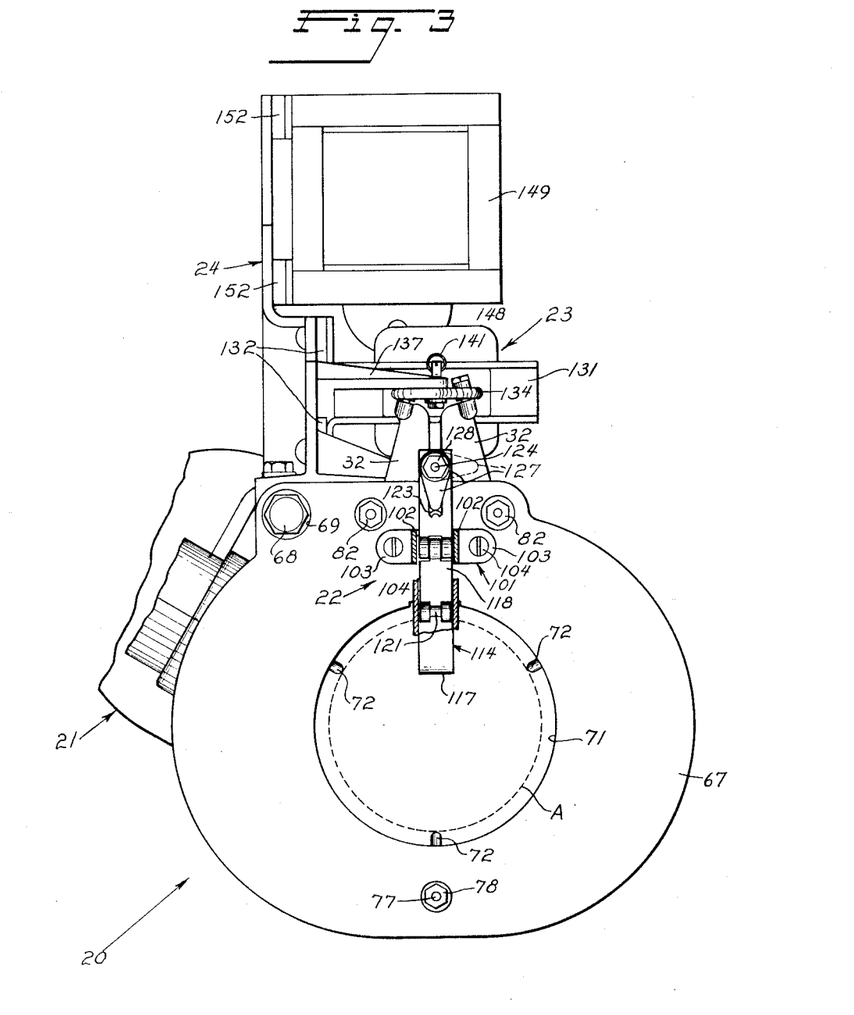
Figure 3 is a bottom plan view of Figure 1.

Stop and switch mechanism 22, located at the lower end of heater or cooker 20, consists of a three sided bracket 101 having its two opposite sides 102 bent at one end to form cars 103 which are fastened to end cap 67 by bolts 104 (Figure 3). The other side 105 of bracket 101 at the other end is extended and bent at a right angle to form a support for a stationary arm 106 of an electrical switch 100. Arm 105 which is insulated from bracket 101 carries contact 107 on its free end. Suitable inturned ears 110 are formed on the free edges of sides 102 for a purpose to be presently pointed out.

A link 108 (Figures 2 and 11) is rolled at both ends 109 to receive pins 111, one of which is mounted between sides 102 of bracket 101 and the other between the sides of a movable switch arm 114 to be presently described. Link 108 has a rectangular opening 112 through which one end of substantially L-shaped leaf spring 113 is passed to dispose spring 113 with one end in contact with the underside of link 108 and the other in contact with the inner face of side 105 of bracket 101. Spring 113 tends to hold link 108 normal to side 105 and arm 114, carrying insulated contact 116 at one end, away from contact 107. The opposite end 117 of arm 114 is curled to form a stop and is disposed within opening 71 of bottom end cap 67. A hinged link 118 (Figures 2, 9 and 10), hinged as at 119, is pivotally connected at one end to arm 114 by pin 121 and has a slot 122 in its opposite end in which the reduced square end 124 of rod 126 is slidably received. A cam surface 123, formed integrally on the lower portion of hinged link 118 by a bent portion of the material from slot 124, is engaged by a cam 127 which is non-rotatably mounted on end 124 of rod 126 and retained thereon by nut 128. Cam surface 123 is held in engagement with cam 127 by tension spring 129, secured at one end to arm 114 and at the other end to bracket 101. So long as cam 127 is in the dotted line position of Figure 3 and heating plates 28 are in non-cooking position, spring 129 forces arm 114 to the right around pin 111 as the pivot points to its retracted position in slot 70 of end cap 67 as shown by the dotted line position of Figure 2. When cam 127 is rotated to the full line position shown in Figure 3, counterclockwise pivoting of arm 114 around pin 111 occurs, ears 110 of bracket 101 acting as stops to prevent upward movement of pin 111 through contact with link 108, and arm 114 is forced to its operative or full line position of Figure 2. Rod 126 extends longitudinally of heater-cooker 20 and its other square end 129 (Figures 1 and 2) is connected to gate valve 21 in a manner to be described later.

Figure 2:
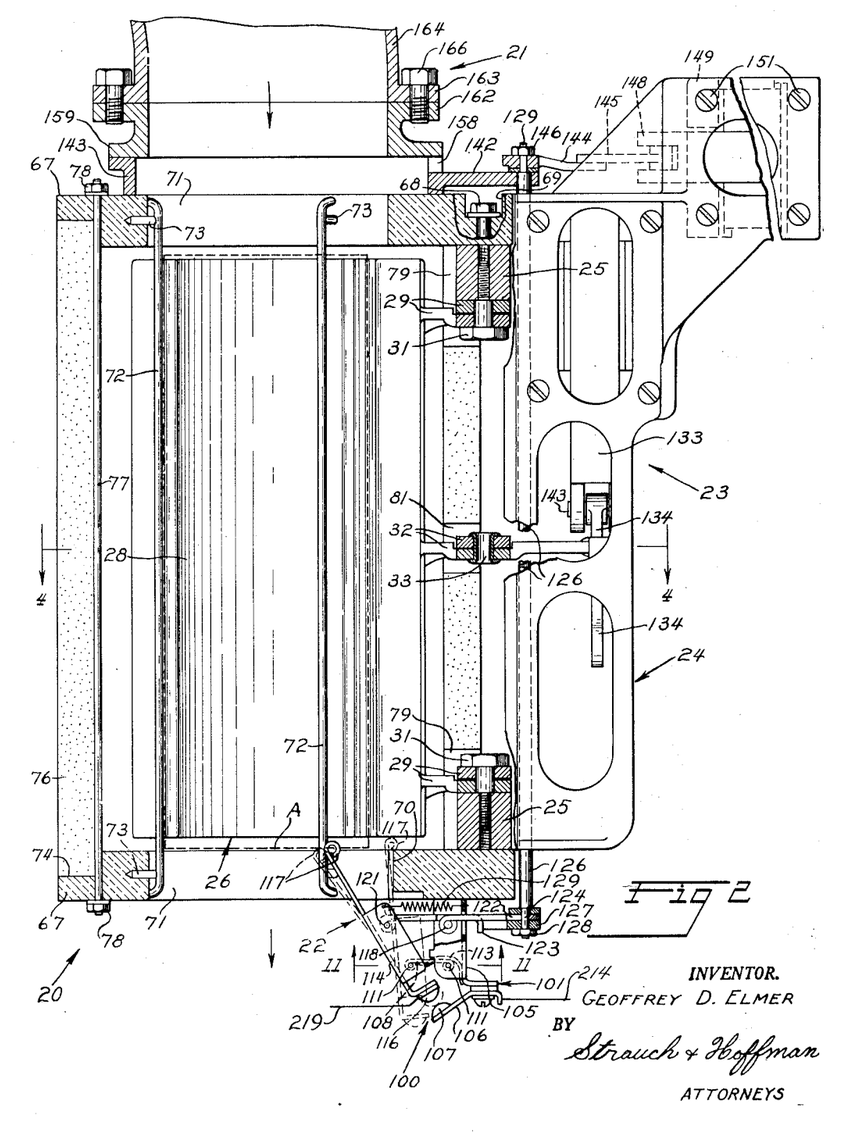
Figure 2 is a sectional view taken substantially on line 2—2 of Figure 1.

When the packaged article A (Figures 1, 2, 3 and 5) has been disposed within heater-cooker 20, arm 114 and rod 126 are in their full line positions as shown in Figures 2 and 3 and further downward passage of article A is stopped by the curled end 117 of arm 114, contact 116 having been forced from its full line position to the dotted line position (Figure 2) into engagement with contact 107. This engagement of contacts 107 and 116, through the electrical circuits about to be described, initiates movement of the heating elements 26 to their closed or working position and converts the heating elements from stand-by series connected heaters to active parallel connected cooking heaters.

For accomplishing this end, the present invention provides the following electrical system, which may be a part of an automatic coin operated vending machine or a manually operated counter cooker. The electrical system includes a solenoid 131 supported in position by frame 24 but thermally insulated therefrom by blocks 132. Solenoid 131, when energized as will be presently described, moves plunger 133 (Figures 2 and 4) and pivotally attached cam 134 upwardly in the direction of the arrow toward its pole face or magnetically neutral center. The sides 136 of cam 134 are generated angularly with respect to its longitudinal center, the maximum rise being at point R, equidistant from the longitudinal center line. Cam 134 is supported in its lowermost position by bracket 137 (Figures 4 and 5) formed as an integral part of frame 24, and is guided in its vertical movement and positioned by pin 138 working in slot 139 of cam 134. A tension spring 141, connected between ear 142 of bracket 137 and pin 143 which joins cam 134 to plunger arm 133, acts to retract plunger 133 to its fully extended position when solenoid 131 is de-energized.

As follower rollers 36 at the terminal ends of arms 32 are held in intimate contact with cam 134 by spring 39 as previously described, when solenoid 131 is energized sides 136 of the cam acting against rollers 36 force arms 32 apart against the action of spring 39 and bring the heating elements 26 into their heating or cooking position. Package runway guides 72 are received in recesses 30 and 30' to allow the polished inner surface of heating plates 28 to intimately engage the outer surface of packaged article A as shown in dotted lines in Figure 5, under the positive pressure imparted to elements 26 by cam 134 and rollers 36. It should be understood that the heating element 26 is designed to operate at a maximum surface temperature of 400° F. which is below the char point of the container.

The upper end of rod 126 is pivotally mounted in ear 142 of lower gate valve housing 143 and the end 129 of the rod has a bell-crank 144 non-rotatably mounted thereon and secured by nut 146 (Figures 1 and 2). A valve 147 (Figure 1) is carried by one end of bell-crank 144 and the other end is pivotally secured by link 145 to plunger 148 of solenoid 149. Solenoid 149 is supported by and thermally insulated from frame 24 by screws 151 and blocks 152. As seen in Figure 1 solenoid 149 is shown in its energized position with plunger arm 148 in its retracted position and acting against spring 153 which is connected between bell-crank ear 154 and valve housing ear 156. Spring 153 returns valve 147 to its closed position when solenoid 149 is de-energized.

Lower valve housing 143 fits flush against end cap 67 and is secured thereto by bolts 157 (Figure 1). An opening 158 is provided in one wall of housing 143 to allow swinging movement of bell-crank 144 and an upper valve housing 159 is secured to housing 143 by bolts 161. The upper face of housing 159 has flanges 162 which are secured to mating flanges 163 on chute 164 by bolts 161. Chute 164 is positioned beneath the magazine outlet of the vending machine.

The purpose of gate valve 69 is to close off the natural upward flow of heat from the device to the magazine and refrigerated section of the vending machine. Also since a closure of this kind prevents free circulation of air through the device, the ambient air within the heater 20 will be substantially static and therefore the temperature of the heating plates 28 can be maintained by the thermostat more uniformly and economically.

Figure 12:
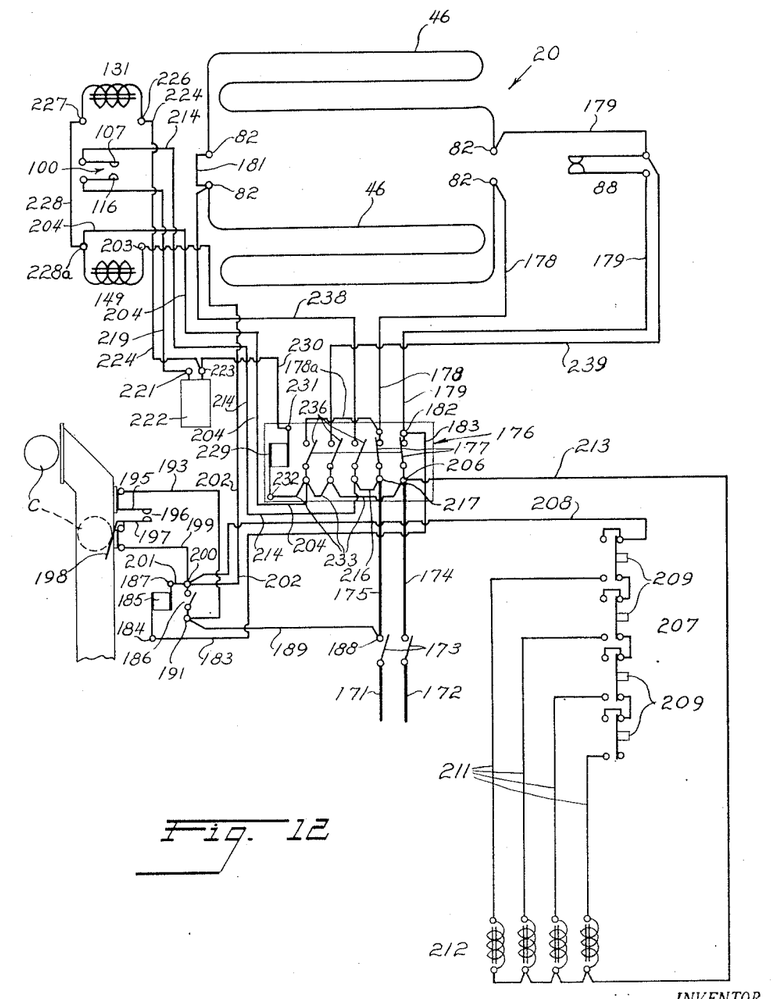
Figure 12 is a typical electrical wiring diagram incorporating the heating or cooking element of this invention in the electrical system of a coin actuated vending machine.

Referring to Figure 12, wherein the heating unit 20 is diagrammatically illustrated in the electrical circuit of a coin operated vending machine, contacts 82 at one end of the heating coils 46 of unit 20 are connected to power lines 171 and 172 of a suitable source of electric energy through a conventional line switch 173; leads 174 and 175; a multipole magnetic switch indicated by box 176 and having normally closed contacts 177; and leads 178 and 179. Contacts 82 at the opposite ends of elements 46 are interconnected by lead 181 so that elements 46 are normally connected in series. When so connected, heating plates 28 are disposed in open, non-cooking position and are capable of supplying standby heat (350° F.) only, gate valve 147 is in closed position over opening 71 of cap 67 to prevent passage of heat into supply chute 164 and the associated refrigerating mechanism, solenoid 131 is de-energized, arm 114 is in its retracted inoperative position in notch 70, and contacts 107 and 116 are open. It will be seen, however, that thermostat 88 is connected in series in line 179 and is operative to automatically control the temperature of cooker 20 and prevent continuous heating of unit 20 with an incident waste of current.

The coin operated mechanism of the vending machine is connected to power leads 179 and 175; the circuit from lead 179 being completed from contact 182, over line 183 to contact 184 of holding coil 185, which operates magnetic switch 186 to contact 187 of coil 185 and the circuit from lead 175 being completed from contact 188, line 189, contact 191, lead 193, to contact arm 195 of switch 196 which is closed by movable contact arm 197 as coin C strikes arm 198 to complete the circuit through lead 199, contact 200, lead 201 to contact 187, thereby energizing holding coil 185 and closing magnetic switch 186. Switch 197 is in closed position only momentarily as the coin passes arm 198 and when open leads 193 and 199 are dropped from the circuit but switch 186 remains closed retaining the circuit through coil 185 closed from contact 187 through lead 201, contact 200, switch 186, contact 191, lead 189 to contact 188.

Solenoid 149 is now energized thru contact 200, lead 202, contact 203, solenoid 149, lead 204 through one side of switch 176 to contact 206 on line 174. When the solenoid 149 is energized gate valve 147 is opened by the action of plunger arm 148 and cam 127 forces arm 114 from its normally inoperative retracted position to its extended or stop position.

One side of the circuit from power lead 175 to package selector push button mechanism 207 is completed from contact 200 of magnetic switch 186 thru lead 208 to push buttons 209 which are single pole, double throw, and in series, preventing the completion of more than one circuit, regardless of the number of buttons depressed. When one button 209 is pushed the other side of the circuit is completed thru the associated lead 211 and its package release solenoid 212 thru lead 213 to contact 206 of power lead 174. When the selected solenoid 212 is energized a packaged article A is released and passes from the magazine of the vending machine through the upper opening 71 into heater 20 where it is intercepted by arm 114 carrying contact 116 of switch 100.

The force exerted against the end of the arm when the packaged article is decelerated is partially absorbed by springs 113 and 129 and is utilized to move contact 116 of arm 114 against contact 107. Closing of contacts 107 and 116 completes a circuit to solenoid 131 from power lead 175 to power lead 174 through closed switch 100 which is connected to power line 175 thru contact 107, leads 214 and 126 to contact 217 and to power line 174 through contact 116, lead 219, contact 221 of time delay switch 222, which is normally closed, thru switch 222, contact 223, lead 224, contacts 226 and 227 of solenoid 131, lead 228 connected at 228a to lead 204 to contact 206. Solenoid 131, when thus energized raises plunger 133 forcing cam 134 to spread apart the free ends of arms 32 and close heating plates 28 about the packaged article.

At the same time, actuating coil 229 of switch 176 is energized from contact 223, lead 230, contact 231 of actuating coil 229, coil 229, contact 232 of coil 229, lead 233 of switch 176 to contact 206 of power lead 174. Energization of coil 229 operates to open the series circuit to the heating elements 46 by opening switch arms 177 and connects the heating elements 46 in parallel through right hand switch arm 236 of switch 176. The parallel circuits are carried by leads 238 and 181 on one side of coils 46 and lead 178 and left hand switch arm 236 of switch 176 and part of lead 179, lead 239 and center switch arm 236 of switch 176 on the other side thereby dropping thermostat 88 out of the circuit and supplying cooking heat (400° F.) from coils 46.

Upon the opening of switch arms 177, lead 183 is de-energized thereby de-energizing holding coils 185 and opening switch 186 to drop solenoid 149 out of the circuit. De-energization of solenoid 149 allows spring 153 to close valve 147 causing rod 126 and cam 127 to rotate and permit spring 129 to retract arm 114 and leave article A gripped between heating plates 28. Since article A is gripped between plates 28 and end 117 of switch arm 114 is in engagement with the lower end of article A, switch 100 is maintained closed.

This assures energization of solenoid 131 from power lead 175 through leads 216 and 214, switch 100, lead 219, time delay switch 222, lead 224, solenoid 131, leads 228, 204 and 233 to power lead 174 until the circuit is broken by opening of time delay switch 222. The parallel heating circuits through heating coils 46 is also maintained from power lead 175 through lead 216 right hand switch arm 236, leads 238 and 181 to lowermost contacts 82, coils 46 to uppermost contacts 82 and then by separate circuits composed of leads 179, 239, center switch arm 236, lead 233 to power lead 174 and leads 178, 178a, left hand switch arm 236, leads 233 to power lead 174. The circuit through holding coil 229 is also maintained from power lead 175 through leads 216, 214, switch 100, lead 219, time delay switch 222, lead 230, coil 229, leads 233 to power lead 174. As a consequence, article A is held by plates 28 and exposed to the cooking temperature produced by coils 46 until time delay switch 222 opens at which time the circuits through coils 131 and 229 are opened to release article A and switch 176 to restore the heating unit to its normal stand-by heating condition, spring 129 acting on arm 114 to move it to its dotted line position shown in Figure 2, spring 129 being of sufficient strength to lift article A upwardly sufficiently to allow end 117 to move to the right out of the path of article A. Since article A is no longer supported between plates 28, it will gravitate through lower aperture 71 of the heating unit into the discharge chute (not shown) where it is retrieved by the customer.

While heating unit 20 may be designed to produce any desired cooking temperature by proper design of coils 46 and the wiring associated therewith and may be set by proper adjustment of time delay switch 222 to maintain the cooking temperature for any desired length of time, the present invention is particularly concerned with the production of a satisfactory hot dog vending machine. Accordingly, the time delay switch is set to maintain a cooking temperature for a sufficient length of time to properly and completely cook a packaged hot dog in a suitable short length of time and coils 46 are designed to assure a sufficient temperature for completing the cooking in the selected time interval. Thus the present invention contemplates a setting of switch 222 to assure a cooking period of 15 seconds and coils 46 are wound and connected to create and maintain the article at a cooking temperature of approximately 212° F. during this cooking period. This is accomplished by constructing the coils 46 of suitable wire to assure a maximum wire temperature of the heating elements at approximately 400° F. and connecting the serially connected heating elements directly to the power leads through thermostat 88, thereby reducing the wattage input about 75% during idling periods. When the control circuits are energized as hereinbefore pointed out to connect the heating elements in parallel, the thermostat 88 is dropped out of the circuit and the wattage input is increased approximately 400% compared to its idling value. It will, therefore, be appreciated that the present invention provides a cooking unit which is relatively inexpensive to manufacture, extremely efficient for cooking during cooking intervals and, due to the extremely low wattage input and the maintenance of the cooking plates at approximately cooking temperature during non-cooking periods, is very economical in use.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An electric heater for use in a vending machine for dispensing individually cooked articles comprising a supporting frame; a pair of opposed heating plates shaped to conform to the shape of the article to be dispensed and mounted on said frame for movement toward and away from each other whereby said article may be successively gripped for cooking and then released; thermal insulating means spaced from and normally surrounding said plates to provide an enclosed space to be heated, said insulating means having article entrance and exit openings; closure means normally closing said entrance opening to prevent heat from escaping from said space through said opening; means for heating said plates; and control means for operating said closure means to admit an article to be cooked and to move said heating plates toward and away from each other to successively grip and cook said article then release the cooked article whereupon it passes through said exit opening to the consumer.

2. The combination defined in claim 1 wherein said thermal insulating means is provided with a plurality of runway guides adapted to assure proper positioning of said article between said heating plates and said heating plates are suitably grooved to freely receive said guides when in article gripping position.

3. The combination defined in claim 1 wherein said mounting for said heating plates comprises a plurality of pivot arms respectively secured at one end to said heating plates and pivotally connected at said other end to said frame and said control means comprises a pair of arms having one end respectively connected to one of said heating plates, a pivotal connection interconnecting said arms at points between their ends so as to dispose the free ends of said arms in opposed relation, and cam means mounted on said frame and adapted to engage said opposed free ends of said arms to effect relative movement of said arms to effect approaching movement of said heating plates.

4. The combination defined in claim 3 together with selectively positioned article operated means adapted when in one position to be engaged by said article when said article reaches its desired position between said heating plates and initiate operation of said cam means.

5. The combination defined in claim 3 together with resilient means adapted to impart opposite relative movement to said arms to effect receding movement of said heating plates.

6. The combination defined in claim 5 wherein said thermal heating means is provided with apertures through which said pivot arms and said pair of arms extend and wherein said cam means and said resilient means are disposed exteriorly of said thermal insulating means so as not to be exposed to the heat of said heating plates.

7. The combination defined in claim 5 together with means associated with said closure for positioning said article operated means in said one position.

8. A heater for a vending machine adapted to receive an object fed by gravity to said heater, comprising a plurality of normally spaced heater units mounted for relative movement and adapted to be selectively moved into and out of heating contact with said object; means operatively connected to said heater units for relatively moving said units toward each other to bring them into said heating contact, and control means intercepting said object when said object reaches a position between said heater units to arrest gravitational movement of said object and connected to actuate said last mentioned means to effect said relative movement of said heater units.

9. In a heater for a vending machine adapted to deliver a prepackaged object of given shape by gravity to said heater, a plurality of heater units having cooperating internal heating surfaces shaped to conform to the contour of the prepackaged object; said heating units being normally separated for insertion and removal of said object and adapted for movement into contact with the prepackaged object; guide means adapted to assure proper positioning of said object between said heating plates; said heating plates having grooves adapted to receive said guide means when said heating plates are in closed position; means operatively connected to said heater units for relatively moving said heater units to bring said internal heating surfaces into embracing contact with the object with sufficient compressive force to insure intimate contact between the heating surfaces and said prepackaged object and maintaining said heater units in contact with the prepackaged object during the cooking period; timing means operative upon said last mentioned means to effect separation of said heating means and release said object upon completion of the cooking period; means operative to maintain said heater units at a first temperature when separated; and means responsive to the movements of said heaters toward each other to maintain said heater elements at a second higher temperature in their second position.

GEOFFREY D. ELMER.

REFERENCES CITED

The following references are of record in the file of this patent:

UNITED STATES PATENTS

| Number | Name | Date |
|---|---|---|
| 1,188,734 | Clement | June 27, 1916 |
| 1,316,190 | Sackerman | Sept. 16, 1919 |
| 1,512,674 | Campbell | Oct. 31, 1924 |
| 1,716,266 | Flamm | June 4, 1929 |
| 1,912,353 | Howe | May 30, 1933 |
| 1,914,649 | Reinhardt | June 20, 1933 |
| 1,948,739 | Wolcott et al. | Feb. 27, 1934 |
| 1,950,772 | Biggs | Mar. 13, 1934 |
| 1,971,091 | Anderson | Aug. 21, 1934 |
| 1,971,387 | Seoville | Aug. 28, 1934 |
| 2,018,698 | Allen | Oct. 29, 1935 |
| 2,112,422 | McCullough et al. | Mar. 29, 1938 |
| 2,207,870 | Myers | July 16, 1940 |
| 2,390,277 | Simpkins | Dec. 4, 1945 |
| 2,392,511 | Thompson et al. | Jan. 8, 1946 |
| 2,421,452 | Cody | June 3, 1947 |
| 2,444,510 | Isserstedt | July 6, 1948 |